C. F. Brush.
Lock Nut.

No. 123,148.  Patented Jan. 30, 1872.

Witness  
Geo. W. Tibbitts  
J. H. Mountcastle

Inventor  
Chas. F. Brush 123,148

UNITED STATES PATENT OFFICE.

CHARLES F. BRUSH, OF CLEVELAND, OHIO.

IMPROVEMENT IN LOCK-NUTS.

Specification forming part of Letters Patent No. 123,148, dated January 30, 1872; antedated January 17, 1872.

SPECIFICATION.

I, CHARLES F. BRUSH, of Cleveland, in the county of Cuyahoga and State of Ohio, have invented a certain new and useful Mode of Locking Nuts, of which the following is a specification:

The nature of this invention relates to cutting a slot through the nut on one side of and in conjunction with the opening in the nut, through which the bolt is passed, one side of said slot being in a plane passing through or near the axis of the nut, and the other side of the slot being curved or angular, the widest part of the slot being next to the bolt-opening. A steel key is provided having one sharp edge, which is placed in the slot, the sharp edge next to the bolt, and the nut is given a slight turn back, causing the key to engage with and cut into the threads of the bolt. There the plain side of the slot rests against the key, effectually preventing the nut from turning from any cause whatever until the nut shall be turned a little forward by a wrench, when the key may be withdrawn and the nut unscrewed. The invention consists in the peculiar construction and arrangement of parts, as hereinafter described and claimed.

Figure 1:
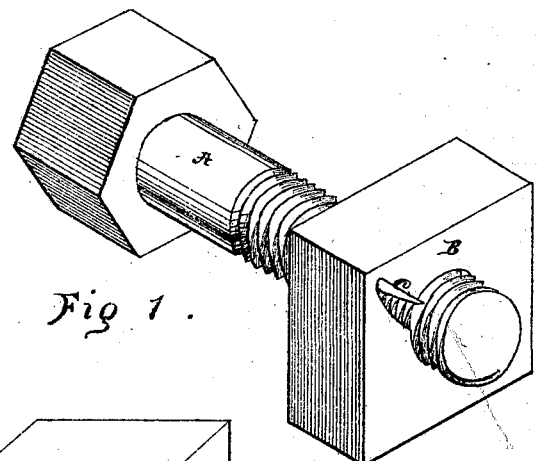
Figure 2:
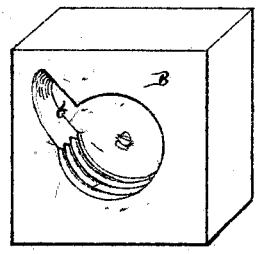
Figure 3:

In the drawing, Figure 1 is a perspective view of a bolt and nut embodying my invention. Fig. 2 is a view of a nut, showing the slot before mentioned. Fig. 3 represents the key.

A, Fig. 1, represents a bolt of the ordinary construction. B is a nut, in one side of which I make a slot, $b$, through the nut in the same direction and in connection with the bolt-opening. One side of said slot I make flat, and in a plane passing near or through the axis of the nut; the other side is made curved or angular. The widest part of the slot is next to the bolt. When the nut is screwed onto the bolt up to the desired point it is given a slight turn more forward, when a key, C, is inserted, which will slip in the curved or longest side of the slot; then the nut may be given a slight turn back, when the sharp edge of the key will be forced into the threads of the bolt a little way, and the plain side of the slot rests and bears against the key. By having the plain side of the slot directed a little past the center of the axis of the bolt it requires some force to turn the nut to release the key, so that the nut is not liable to be turned either way. The key consists of a small flat piece of steel, having one sharp edge to engage readily with the threads of the bolt. By this means a most effectual and simple means is obtained for locking nuts.

I do not claim broadly a nut-lock consisting of a key located in an opening in the nut and engaging with the bolt, as this is not new; but

I claim—

The nut B, formed with the recess $b$, having a straight and a curved side, and extending entirely through the nut in communication with its central opening for the bolt, the nut being kept from turning loose by a steel key, $c$, tapering in cross-section, fitted in the recess $b$, and engaging throughout its length with the threads of the bolt, as herein shown and described, for the purpose specified.

CHAS. F. BRUSH.

Witnesses:
GEO. MENGER,
J. L. WOOD.